Sept. 21, 1943.  P. KALOWSKI  2,329,839
APPARATUS FOR MAKING GOLF BALLS
Original Filed April 15, 1940  4 Sheets-Sheet 1
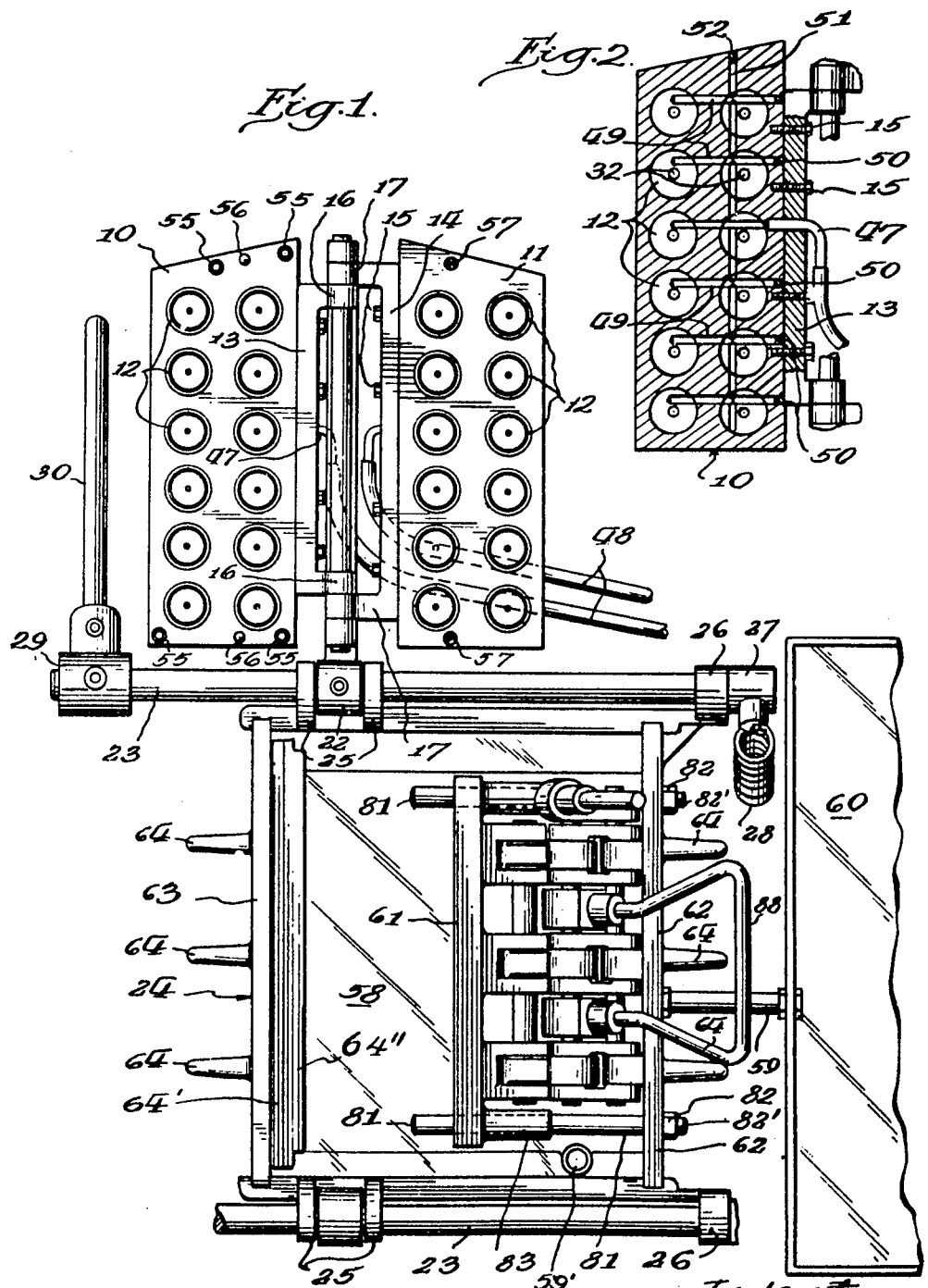

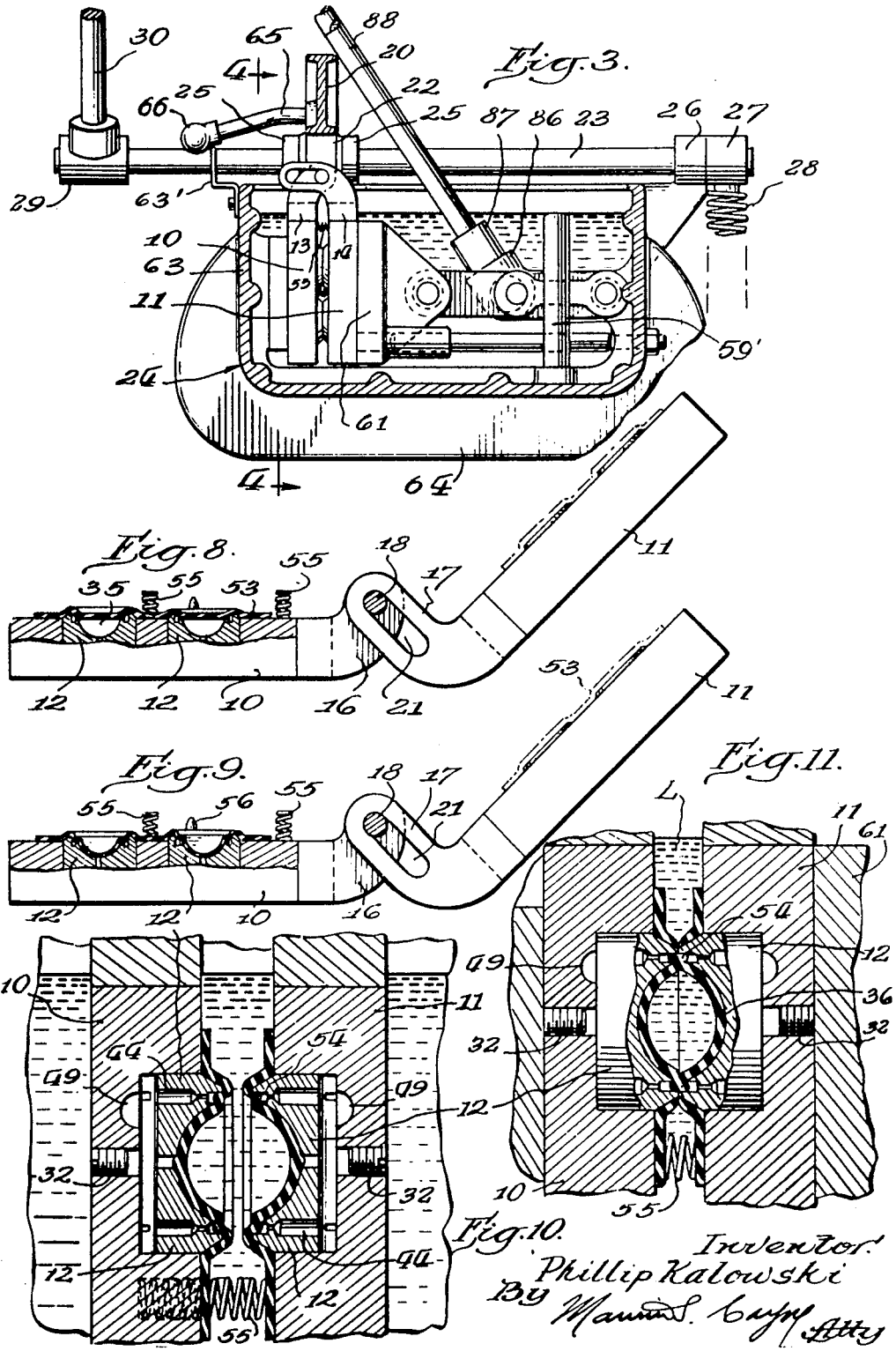

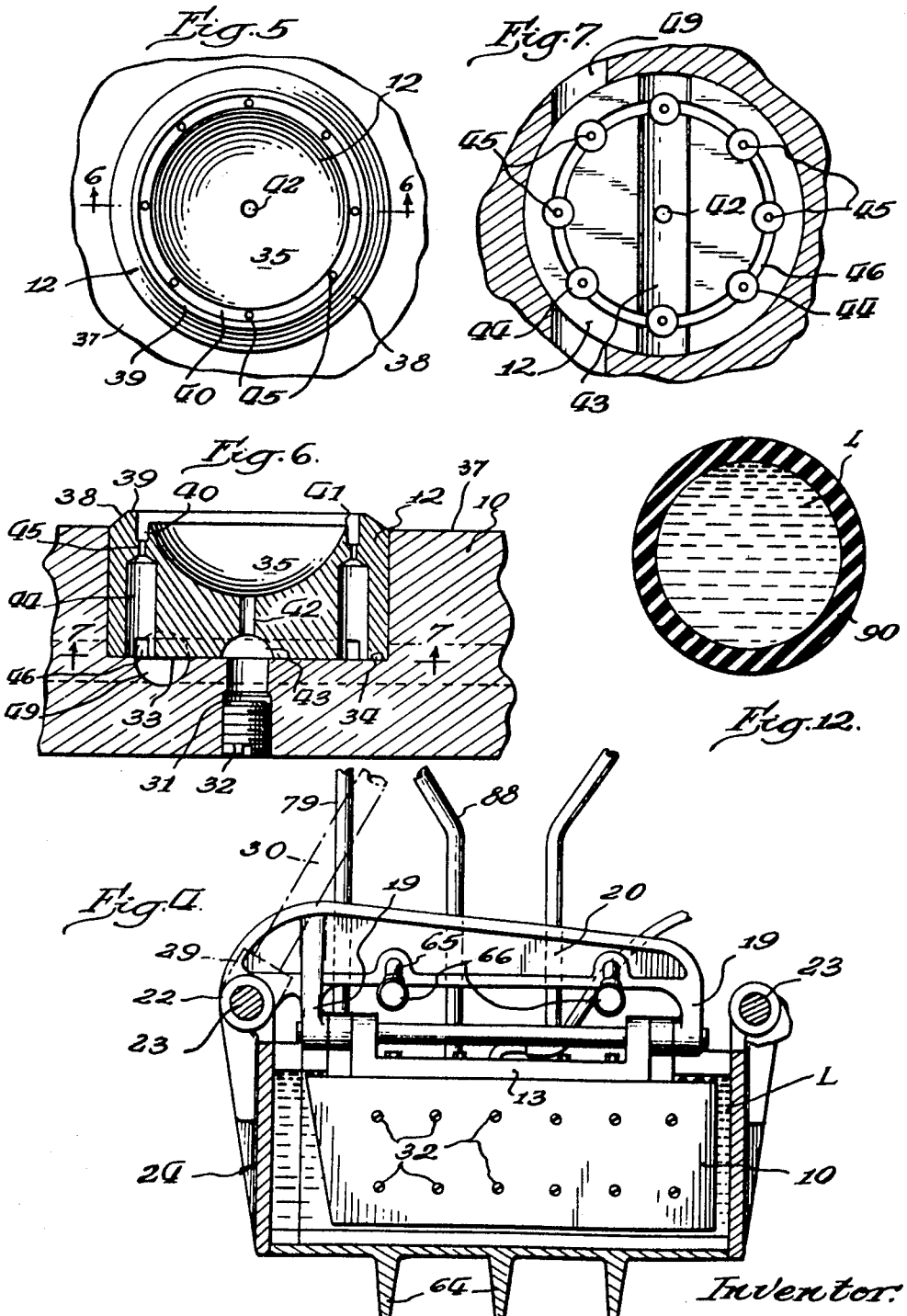

Sept. 21, 1943.     P. KALOWSKI     2,329,839
APPARATUS FOR MAKING GOLF BALLS
Original Filed April 15, 1940     4 Sheets-Sheet 4
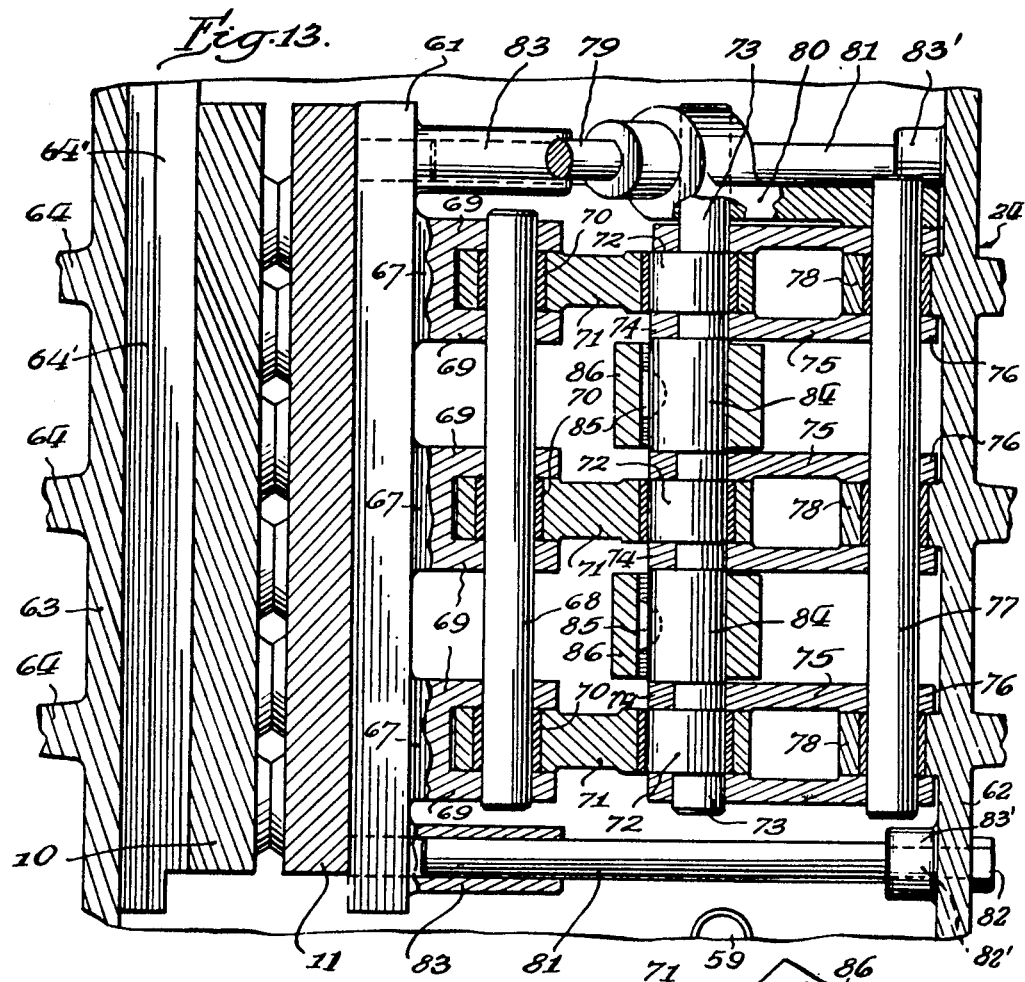
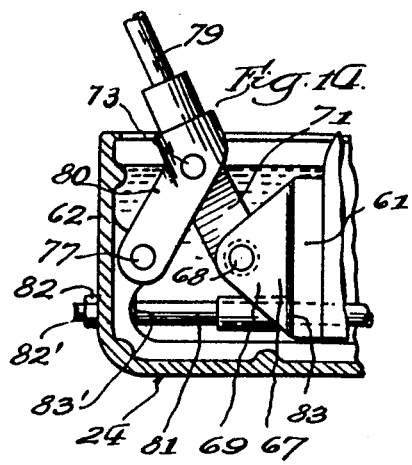
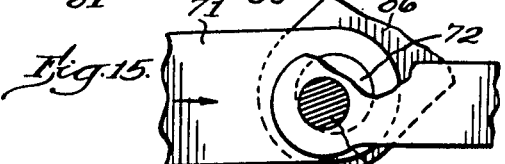
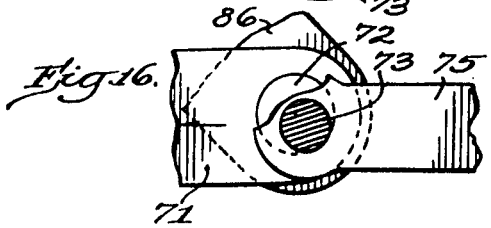
Inventor
Phillip Kalowski
By Maurice S. Cayne Attys Patented Sept. 21, 1943

2,329,839

UNITED STATES PATENT OFFICE 2,329,839

APPARATUS FOR MAKING GOLF BALLS

Phillip Kalowski, Chicago, Ill., assignor, by mesne assignments, to Erwin Huebsch, Chicago, Ill.

Original application April 15, 1940, Serial No. 329,627. Divided and this application October 9, 1941, Serial No. 414,270

7 Claims. (Cl. 18—5)

This invention relates to apparatus for the manufacture of the centers or cores of so-called liquid center golf balls and more particularly relates to apparatus for carrying out the method described in my copending application for Method of and apparatus for making golf balls, Serial No. 329,627, filed April 15, 1940, of which this is a division.

The method referred to in said application consists generally of forming the halves of a hollow container from a vulcanizable material such as sheets of raw rubber in appropriate molds, immersing both of the molds in a bath of liquid with which the container is to be filled, then bringing the halves together while so immersed, thereby simultaneously joining them, confining liquid within the container, and cutting said halves from said sheets.

The object of this invention is to provide novel and improved apparatus for carrying out my method in efficient and expeditious manner.

A further object of the present invention is the provision of novel molds adapted to have segments of a hollow body formed therein by means of applying suction thereto.

A further object of the present invention is to provide novel means for retaining a plurality of molds adapted to form segments of a hollow body therewith by means of applying suction thereto.

Still a further object of the present invention is to provide novel molds for use in the manufacture of liquid filled centers for golf balls said molds being adapted to have formed therein sections of a body of vulcanizable material adapted to be filled with liquid, said molds each being provided with means for drawing one of said sections from a sheet of vulcanizable material and being further provided with means whereby same may be cut from said sheet simultaneously joining said section with a similar one.

Still a further object of the present invention is to provide novel and improved apparatus for carrying out each and every one of the steps of my new method of manufacturing golf ball centers.

Still a further object of the present invention is to provide a novel basin for retaining a bath of liquid adapted to be enclosed within the centers adapted to be made by my improved method.

Still a further object of the present invention is to provide novel means for retaining molds whereby sections of my golf ball center may be formed, said retaining means being provided with mechanism whereby same may be moved to be immersed in a bath and brought together cooperatively.

A further object of the present invention is the provision of novel apparatus to bring together the holders of halves of my golf ball centers under considerable force and without the exertion of effort on the part of the operator.

Another object of my invention is to provide a simplified apparatus for carrying out my improved method, said apparatus consisting of a basin adapted to contain a bath of the liquid to be confined in my new golf ball centers, said basin having associated therewith a plurality of pairs of mold retainers arranged to be moved thereinto, each pair of retainers having a plurality of mold inserts for forming halves of hollow containers from sheets of vulcanizable raw rubber, the retainers being connected with a source of suction and having a system of passageways therein connecting the source of suction to each of the mold inserts, said retainers being hingedly attached to one another and to means rotatable into the basin, the said basin having a cam-lever arrangement for applying considerable force to the retainers when in position in the bath, thereby forcing them together to form the liquid centers below the surface of the liquid comprising the bath.

Still further objects of my present invention lie in the provision of advantageous details of construction of my new apparatus.

With the foregoing and other objects in view which will appear as the description proceeds, the invention consists in certain novel features of construction, arrangement and combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of by invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings:

Fig. 1 is a plan view of the apparatus of my new invention in position prior to receiving sheets or slabs of rubber upon the molds thereof.

Fig. 2 is a sectional view through one of the mold retainers.

Fig. 3 is a sectional view through the basin with the mold retainers juxtaposed in the process of forming liquid filled centers.

Fig. 4 is a sectional view taken generally along the line 4—4 of Fig. 3.

Fig. 5 is a plan view of one of the molds in position in the mold retainer.

Fig. 6 is a sectional view of the mold taken along the line 6—6 of Fig. 5.

Fig. 7 is a sectional view taken on a transverse plane through the mold generally indicated by 7—7 of Fig. 6.

Figs. 8 and 9 illustrate portions of the process of forming the bodies of the centers upon the mold retainers and within the molds.

Figs. 10 and 11 illustrate the completion of the liquid filled body within the basin and between the mold retainers disposed therein.

Fig. 12 is a sectional view through a completed liquid filled center.

Fig. 13 is a sectional view through the compression mechanism in the bath basin with the compression fully applied to the mold retainers.

Fig. 14 is an elevational view of the positioning portion of the compression mechanism.

Figs. 15 and 16 are two views showing the camming action of a portion of the compression mechanism.

Slabs or sheets of raw vulcanizable rubber are disposed upon respective series of molds adapted to form the halves of the completed liquid-filled bodies and vacuum is applied to the molds inside thereof. The individual molds of the series each having a half formation therein, they are accurately brought together after being immersed in a bath of the liquid with which the centers are to be filled. Considerable force is then applied to the molds causing the halves of the vulcanizable material to unite at the edges thereof, confining liquid therein and at the same time cutting the halves now formed into individual containers, out of the slabs or sheets from whence same were formed. The bodies or containers are then removed from the molds and are placed in perfectly spherical vulcanizing molds and thus vulcanized to completed shape.

The apparatus described is advantageously suited for carrying out my new method, but obviously variations and modifications are possible without departing from the basic scope of the invention.

The apparatus which I utilize consists primarily of four elements or groups of mechanisms associated for the performance of a function or series of functions producing a singular result. These are (1) molding apparatus, including molds, evacuating and shaping means, and support therefor; (2) immersing apparatus, including means and mechanisms for associating the molds so that they may be immersed, mechanism for immersing the molds and for removing same from the bath, the bath itself; (3) compression apparatus, including mechanism for bringing the molds together while in the bath and squeezing the same with great force to cause the halves to unite and be cut out of their slabs, and levers and cam arrangements for accomplishing same; and (4) vulcanizing apparatus, including appropriate molds, vulcanizing ovens, and handling apparatus.

It should be obvious that while I have separated the elements above into more or less distinct classifications for the purpose of discussion, the elements are so inter-related that a presentment of any one would hardly be complete without reference to at least portions of the others. With this in mind, I shall now proceed to describe the specific construction of the apparatus of my invention.

The reference characters 10 and 11 designate generally a pair of wing-like members hereinafter referred to as mold retainers adapted to have a plurality of inserts, hereinafter termed molds 12 disposed therein. Said molds 12 are formed in a manner described below and are forced into openings provided therefor in the retainers 10 and 11. The molds 12 are disposed in rows along the retainers as shown and are adapted to cooperate with one another when said retainers 10 and 11 are brought together. The retainers 10 and 11 are provided with hinge brackets 13 and 14 respectively, fixed thereto on edges thereof by means of bolts 15 or the like. Said hinge brackets are provided with bearing portions 16 and 17 respectively, integrally formed therewith and rotatively journalled on a cylindrical shaft 18 fixedly positioned between the arms 19 of the plate member 20. The bearing member 17 is provided with a slotted opening 21 instead of the conventional circular opening with which the bearing portion 16 is provided in order to permit the motion of the retainer 11 parallel to the retainer member 10 under certain conditions described below.

The plate member 20 is generally of I-shaped cross section for strength and lightness and is provided at one end thereof with an integrally formed bearing 22 which is keyed or in other manner fixed to a rotatable shaft 23. Said shaft 23 is positioned at one side of the basin 24 as shown by means of a pair of ears 25 attached to said basin 24 and between which the bearing 22 is adapted to rotate and a bracketed collar 26 also attached to said basin at one end thereof.

It should be understood during this explanation that the entire apparatus may be disposed upon any table or framework for the purpose of support thereof, but the possible variations are so great that no means of support has been shown. If a table is used, the basin 24 is fixed thereto. If any framework is attached, it is attached to the basin.

One end of the shaft 23 is provided with a collar 27 attached thereto, said collar having an arm thereon to which is attached a heavy coil spring 28, the other end of said spring being attached to the means supporting the basin, or to the basin 24 itself. The spring 28 is so positioned as to exert a moment upon the shaft 23 opposite in direction to the moment exerted upon the shaft by the weight and size of the mold retainers 10, 11 and the plate member 20, thereby balancing same to some extent and facilitating the manipulation thereof. The end of the shaft 23 opposite to the collar 27 is provided with a fixed sleeve 29 having an arm 30 attached thereto. The purpose of the arm 30 is to permit swinging of the assembly of mold retainers 10 and 11 together with the plate member 20 about the shaft 23 and into the basin as will be described hereinafter.

Each of the wing-like mold retainers 10 and 11 is provided as explained above with molds arranged, in the embodiment shown, in parallel rows along one side or face of said retainers.

Said molds 12 are disposed within cavities 34 provided therefor and may be forced or screw-threaded into their positions as shown. The embodiment shown provides for forcing of the molds 12 into position, the opposite face of the retainer being provided with an opening 31 associated with each of said molds 12 which is adapted to receive any blunt instrument for the purpose of knocking the molds out of their seats if desired. These openings 31 are normally plugged with screw-threaded plugs 32.

Each of the molds is for all purposes exactly like the others, hence an explanation of one will suffice. The mold 12 comprises a cylindrical member, one face 33 of which is disposed within the cylindrical seat or cavity 34 provided therefor in the mold retainer, and the other face of which is exposed to the face 37 of the retainer. The exposed face of the mold 12 is hollowed concavely in the center thereof at 35 to conform to the shape of half of the proposed liquid-filled center prior to the vulcanization thereof. It is obvious that the mold adapted to cooperate with the half being described will be its counterpart and hence the shape resulting will be that formed between the two concave portions of the molds.

In determining the shape which I would utilize for the unvulcanized center, my experiments have extended from spherical to various shapes obtained by increasing or decreasing the vertical diameter of a sphere. I have thus far found that satisfactory results can be obtained from practically any shape utilized, but the shape shown in the drawings has produced the most satisfactory results. Fig. 11 shows a liquid-filled body 36 having such a shape. This shape is obtained by making the hollows 35 less than half of a sphere so that the body produced is more or less oblate in geometrical configuration. I find that pressure distribution is most uniform with this shape and the body produced is consequently of uniform thickness.

The exposed face of the mold 12 projects slightly above the surface 37 of the retainer 10 and is beveled as at 38 to produce a more or less limited area cut off ring 39. Immediately radially inward of the ring 39 is a deep annular groove 40 which causes the edge of the concave hollow 35 to be sharply defined as shown at 41. The bottom of the hollow 35 is provided with a passageway 42 which leads to the bottom of the mold 12. Across the bottom of the mold 12 I provide a groove 43 which communicates with the passageway 42. Circumferentially spaced about the mold 12 are a plurality of passageways 44 extending longitudinally thereof and each communicating with a reduced diameter portion 45 opening up to the bottom of the annular groove 40 for a purpose to be described presently. The bottom of each of the passageways 44 are connected by means of an annular groove 46 cut in the bottom face 33 therebetween.

From the above description it should now be apparent that all of the passageways which open up to the face of the mold retainer 10 are interconnected so that when suction is applied to the system it will be of equal unit strength at each of the openings 45 and the opening 42. In order to apply a vacuum to each of the molds 12 the retainers 10 and 11 are provided with systems of grooves and passageways which interconnect each of the cavities 34 and which connect also with a tube 47 extending out from one of the edges of each of the retainers 10 or 11. Said tubes 47 lead to a controlled source of vacuum such as a pump or the like (not shown) by means of rubber tubes 48 or any other convenient means.

While any convenient method of arranging the passage and groove system within the retainer may immediately suggest itself to those skilled in the art, I have shown a simple and satisfactory one which gives good results. I drill a plurality of holes along the edge of the retainer as shown in Fig. 2 resulting in the passageways 49 which thus connect the arranged pairs of the mold inserts 12. The passageways are drilled at the exact level of the cavity bottom 34. The ends of the passageways 49 are then plugged as at 50 except for one which is provided with the tube 47 as above described. A long passage 51 is formed by drilling from one end edge of the retainer at the same level as passages 49 and perpendicularly thereto and connecting one row of cavities 34. Its end 52 is then plugged. It is believed that the passageway system that I utilize has been sufficiently described so that an explanation of the operation thereof in applying vacuum to all of the openings in the molds 12 is unnecessary.

Referring again to the molds 12, it will be noted that the construction thereof is peculiar in the arrangement of the openings. I have found that without the arrangement which I use, difficulties in separating the member formed from the slabs out of which it is formed arise. The provision of the groove 40 and the circumferentially spaced openings 45 within the groove provide a most efficient cutting means.

In operation, first a slab 53 of raw unvulcanized rubber is laid over the mold 12 and a similar slab is placed over the companion mold 12 in the opposite mold retainer adapted to cooperate therewith. A valve in the pressure system is then opened drawing air out of the passageway and groove system described above and exerting a vacuum or suction through the openings 42 and 45. The slab 53 is sucked down into the cavity 35 of the mold 12 and caused to conform to the contour thereof by means of the opening 42 as shown in Fig. 9. The portion of the slab 53 disposed immediately over the annular groove 40 is drawn into the groove by the vacuum exerted by the circumferentially spaced openings 45 positioned in the groove. The drawing of the slab into the groove forms a bead 54 about the rubber half being formed also causing slight protuberances to be drawn into the entrances of the openings 45. The bead 54 and the protuberances are not necessary to the formation of the member 36 but they are also not detrimental to the finished product shown in Fig. 12. Their presence, however, indicates that the maximum beneficial vacuum has been applied so that the slab is drawn as tightly down into the cavity 35 and as completely about the mold 12 as is possible. The tight fit of the member within the cavity and the drawing taut of the edge of the half being formed besides causing the formation of a more perfect member 36, tightly draws the slab 53 down upon the cutting ring 39 so that when two molds are forced together there will be a perfect cutting off of the halves from their respective slabs. The halves in the meantime are caused to adhere by reason of the beads 54 being forced together and joined immediately adjacent to the place where the cutting off occurs. The pulling down of the edges by the openings 45 into the groove 40 produces a comparatively wide area in which the halves are contacted when brought together thus causing perfect adherence without loss of liquid.

It will be seen that there are certain variables which must be controlled in order to produce satisfactory liquid-filled centers from molds of the type that I have just described. A few of these which must be determined by trial are the size of the openings 45 and the groove 40, amount of pressure to apply and so forth. It should be obvious that the pressure should not be so great as to draw the rubber into the openings an amount which will produce substantial protuberances or cause pieces of rubber to be drawn into the passageways. The openings should be of a size to be effective yet not cause undue marks on the surface of the completed member. The dimensions of the openings and grooves is thus a matter of choice, judgment and skill.

With regard to the amount of spaced openings 45, I have found that the most satisfactory number is above four. The number may be increased according to the adjustment of the variables, but it should be considered that there is a maximum which will produce satisfactory results and that amounts above that will be expensively superfluous. I have illustrated the invention described herein showing eight passageways 45 in each of the molds 12, but I do not wish to limit myself to that amount. Further, it should be remembered that my method operates most satisfactorily with such openings 45, but I have produced reasonably satisfactory liquid-filled centers by my new method utilizing molds with no openings 45, and with all numbers of such openings 45 about the rim of the cavity 35 from two and on up, including odd number configurations.

Assume that two slabs 53 have been positioned upon each of the retainers 10 and 11 and portions thereof have been drawn into the cavities 35 and the grooves 40 of all of the molds 12 contained in the retainers. The retainer 11 is now rotated counter-clockwise as viewed in Fig. 8 about the shaft 18 until it rests upon the stiff coiled springs 55 positioned in the retainer 10 in generally rectangular configuration in order to support the retainer 11 spaced from itself.

The two retainers are now in juxtaposed position. In orders to assure perfect alignment of the respective molds 12 the retainer 10 is provided with a pair of fixed conical-ended hardened steel pins 56 on each end thereof on the face 37 of the retainer adapted to cooperate with a pair of correspondingly positioned openings 57 in the retainer 11. It is desirable that when the retainer 11 is resting upon the springs 55 the pins 56 are just disposed in the entrances of the holes 57 preparatory to entering same. Both of the retainers are then moved together about the shaft 18 to a position where they are in the plane of the plate-member 20. The bar member 30 is then rotated clockwise causing the rotation of the shaft 23 and moving the plate member 20 and the juxtaposed retainers 10 and 11 into the position shown in Fig. 4 within the space 58 provided therefor in the basin 24. The basin is provided as previously explained with ears 25 and brackets 26 for the purpose of supporting the shaft 23.

The basin 24 is formed of cast iron or steel in the embodiment which I have used and is connected by a pipe 59 with a reservoir 60 in which the level of the water or other liquid used may be maintained. Cocks and valves are contained in the reservoir, but the system forms no part of my present invention other than assuring a source of liquid. The level of the liquid in the basin is such that when the juxtaposed retainers are rotated into the space 58 they are completely below the surface of the liquid, the level being controlled by overflow drainpipe 59'. With regard to the type of liquid used, I have found the most convenient and economical to be water, of course, but my invention may be utilized with practically any of the liquids commonly used in golf ball centers.

Within the basin is provided a mechanism for squeezing or compressing the juxtaposed retainers 10 and 11 together to cause the halves to unite and be cut out of the slabs 53. The specific details will be presently described, but generally, the force is applied by bracing a movable member 61 against the rear wall 62 of the basin and squeezing the juxtaposed retainers between the member 61 and the front wall 63. In other words the forces applied tend to separate the walls 62 and 63.

In order to prevent injury to the basin as caused by this tendency of the walls 62 and 63 to separate, it being understood that the forces applied by the compression mechanism are enormous, I provide novel means for reenforcing the basin. About the basin 24 and molded integrally with the bottom and the two walls front 53 and rear 62 are a plurality of heavy clamp-shaped ribs 64 with their longest cross-sectional dimension positioned parallel to the direction in which the squeezing force is applied. The ribs 64 also serve as rests by means of which the basin 24 may be disposed upon a table or the like.

The front wall 63 has a stand-off pad 64' preferably integrally formed therewith to prevent the force from the retainer to be applied directly against the wall 63. A removable block 64" is positioned in front of the stand-off pad. Thus, if there is variation in the size of the retainers used with the basin, it may be compensated for by replacement of the block 64".

In rotating the juxtaposed retainers 10 and 11 into the space 58 within the basin the bar member 30 is used by the operator as heretofore explained, and assisting in the operation is the heavy coiled spring 28. The amount of rotation possible is limited by a plurality of bar members 65 fixed to the sides of the plate member 20 and having rubber bumpers 66 attached to the ends thereof. Said bumpers 66 are adapted to come to rest upon the front wall 63 of the basin 24 to properly position the retainers within same. An auxiliary rest 63' may be provided for the bumpers offering a higher surface than the edge of the wall of the basin if it is so desired.

With the retainers in position in the basin 24 under the surface of the liquid, the next operation is to squeeze or compress the retainers together to cause the molded halves to unite. Of course, since this operation is carried on under the surface of the liquid, the resulting body will be devoid of any air and will have the liquid contained therein under slight compression. The reason for this is the fact that the inner volume of the final liquid-filled member 36 is slightly less than the volume when the halves begin to unite.

In order to bring the retainers 10 and 11 together, I provide a novel camming mechanism which finally places the retainers under great pressure to cause the desired operation. The movable plate member 61 is provided with a plurality of brackets 67 which have a shaft 68 extending through ears 69 provided thereon. Positioned between each pair of ears 69 and rotatively mounted on the shaft 68 is the bearing portion 70 of a link member 71. In the embodiment illustrated, I have utilized three of such brackets 67 and consequently have provided three of the link members 71 rotatively attached thereto. Each of the link members 71 is journalled upon the eccentrically placed cams 72 of a camshaft 73 journalled within the bearing portions 74 of three link members 75 aligned with the link members 71. The secondary link members 75 have their ends 76 rotatively journalled upon an auxiliary shaft 77 which is fixed to the rear wall 62 of the basin 24 by the bearing brackets 78. Thus it will be seen that the three link members 71 each have one end thereof fixed to the movable member 61 and the three link members 75 each have one end thereof fixed to the rear wall 62. The free ends of all of said link members are commonly attached to the cam shaft 73. Therefore, if the camshaft 73 is raised in a toggle action, the links will fold as shown in Fig. 14 and the movable member 61 will be caused to move back and forth.

For the purpose of causing the toggle action to occur, I provide a lever bar 79 fixed to the cam shaft 73 at one end thereof by means of a link 80 rotatively attached to an end of the auxiliary shaft 77. When the retainers 10 and 11 in juxtaposed position are moved into the basin, the member 61 is moved out of the way as far as possible as shown by Figs. 1 and 14. When the juxtaposed retainers are in position in the basin, the lever arm 79 is pulled forward, or to the right as viewed in Fig. 14, straightening out the link members 71 and 75 to the position generally shown in Figs. 3, 13, and 15. In this position, the final pressure is applied as will be explained.

In order for the retainers to move parallel to one another when in this position and when pressure is being applied, I have provided the slotted portions 21 in the members 17 of the retainer 11. The slot 21 is disposed parallel to the line of motion when the retainers are in juxtaposed position in the basin, thus enabling the retainers to be compressed together.

During the motion of the movable member 61 to the right and left as viewed at Fig. 1, it is guided by means of a pair of rod members 81. Said rod members are attached to the rear wall 62 of the basin 24 by means of nuts 82 affixing the reduced diameter threaded ends 82' thereof to a boss 83' provided thereon. The movable member 61 is provided with a pair of integrally formed sleeves 83 which are adapted to have said rods 81 disposed therein so that same is slidable thereon.

Disposed between the link members 75 and keyed to the portions 84 of the cam shaft 73 as shown at 85, are a pair of members 86 which have sockets 87 formed therewith. Disposed within these sockets are the ends of a substantially U-shaped bar member 88 which serves as a hand grip. As the bar member 88 is rocked back and forth or to the right or left as shown in Fig. 3, it causes rotation of the cam shaft 73. This is best shown in Figs. 15 and 16. Rotation occurs about the shaft 73 and causes eccentric cams 72 of the cam shaft to revolve. It will be noted that as the cams 72 are revolved in a counter-clockwise position about the shaft 73 from the position shown in Fig. 15 to that shown in Fig. 16, the link 71 will move a slight amount to the left, said amount being equal approximately to the difference in diameter between the cam 72 and the shaft 73.

It is well known that a camming action such as explained is of considerable efficiency and that great forces can be applied by means thereof. Further, the extreme leverage obtained by the use of the bar member 88 serves to increase the force applicable by means of the mechanism described.

What occurs in operation, is as follows:

After the juxtaposed retainers 10 and 11 have been inserted into the basin 24, the movable member 61 is caused to move to the left as viewed in Fig. 13 as far as possible by causing the link members 71 and 75 to straighten out in toggle action. This is done by means of the lever arm 79 and its associated mechanism. With the lever arm held tight to prevent folding of the links 71 and 75, the bar 88 is pulled forward causing the camming action and placing the retainers 10 and 11 under considerable pressure, thereby causing the preformed halves of the member 36 formed within the molds 12 to unite and form the complete liquid-filled golf ball center.

The bar member 88 is then moved back releasing the pressure from the retainers and following this the member 61 is also moved rearward, and the bar 30 is manipulated to swing the retainers out of the basin 24 to the position shown in Fig. 1. The liquid-filled centers 36 are then removed and placed on suitable trays, and the scrap remaining from the two slabs 53 is disposed of.

Following this, the liquid-filled members 36 are placed in appropriate vulcanizing molds and vulcanized in any appropriate manner. In so placing the centers, I prefer positioning them so that the beads 54 will run perpendicular to the feather caused by the vulcanizing mold. The result is the perfect liquid-filled sphere 90 shown in Fig. 12.

It will be noted that during the entire explanation above, I have constantly referred to only one pair of retainers, and have pointed out mechanism for manipulating same. As will be indicated from Fig. 1, I have provided a duplicate set of retainers 10 and 11 on the opposite side of the basin 24, together with the associated shafts 23, ears 25 and so on. Thus, the single basin serves two pairs of mold retainers. Explanation of the construction of the second pair of retainers is obviously unnecessary since the same are the counterparts of the pair described above.

For increasing the rate of production of my liquid-filled centers, I have found that the arrangement of a pair of retainers on either side of the basin is a convenient one. Thus, while the left pair of retainers is being operated upon, and provided with slabs 53, inserted in the water and the pressure applied, and so on, the right pair of retainers which has, in the meantime, just undergone this process, is being serviced by the removal of the scraps and centers formed thereon, so that as soon as the left pair are removed from the water, the right pair, which have been provided with the slabs in the meantime, are ready to go into the basin. The process may thus continue at an unusually high rate of speed. Obviously, although these operations are performed by hand, the device adapts itself readily to mechanical operation.

It will be seen that I have provided ingenious apparatus for carrying out my invention, said apparatus being simple, rugged and efficient, and being capable of producing perfect liquid centers economically and at an exceedingly high rate.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

What I claim and desire to secure by Letters Patent of the United States is:

1. A device of the character described, comprising hingedly associated mold retaining means having a plurality of molds therein, said molds being adapted to cooperate to form hollow bodies from materials disposed therein, a basin adapted to contain a bath of liquid to be enclosed within said hollow bodies, means holding said mold retaining means in temporarily spaced relation, said mold retaining means being hingedly associated with said basin whereby same may be rotated into said bath while in said temporary spaced relation, means in said basin for forcing said molds into cooperative relation while in said bath.

2. A device of the character described, comprising a pair of hingedly associated mold retaining members, a plurality of molds retained within said members and adapted to cooperate to form a plurality of hollow bodies from materials disposed within said molds, a support member for both of said retainer members, a basin adapted to hold a bath of a liquid to be enclosed within said bodies, said support member member being mounted on said basin whereby said mold retaining members may both be moved into said bath, said retainers having means spacing same one from the other when same are rotated to a juxtaposed position, means provided within said basin for moving said retainers together in a parallel motion overcoming said spacing means and causing said molds to cooperate to form said bodies.

3. In a device of the character described, a pair of mold retaining members, each adapted to form cooperative halves of hollow bodies, a basin adapted to contain a bath of a liquid to be enclosed within said bodies, support means rotatively disposed to one side of said bath, means hingedly associating said members with said support means whereby said support means may be rotated to immerse said members in said bath when said members are arranged in parallel spaced relationship, said hinged means having slots permitting parallel movement of said members to cause the halves to cooperate while said members are so immersed, and means for causing said parallel motion.

4. A device of the character described comprising means for forming cooperative segments of a hollow body from deformable material, means for holding said first mentioned means in temporarily juxtaposed spaced relationship, a basin adapted to contain a bath of a liquid to be enclosed within said hollow body, means for supporting and moving said first mentioned means into said bath to be immersed therein while in said temporary spaced relationship, and means for moving said first mentioned means into cooperative engagement while so immersed.

5. A device of the character described comprising molding means adapted to form cooperative segments of hollow bodies from deformable material, means for holding said molding means in temporarily juxtaposed spaced relationship, a basin adapted to contain a bath of a liquid to be enclosed within said bodies, means associated with said basin for supporting and moving said molding means into said bath while in said temporary spaced relationship, and means in said basin operable to cause cooperative engagement between said molding means while immersed in said bath.

6. A device of the character described comprising means for forming cooperative segments of a hollow body from sheets of deformable material by vacuum, means for applying and maintaining said vacuum, means for holding said first mentioned means in juxtaposed temporarily spaced relationship, a basin adapted to contain a bath of a liquid to be enclosed within said body, means for moving said first mentioned means into said bath while in said temporary spaced relationship and with said vacuum being maintained, and means for supporting and moving said first mentioned means into cooperative engagement while so immersed.

7. A mold adapted to form substantially half of a hollow body from a sheet of deformable material, said mold having a cavity of a shape corresponding to said half, means whereby suction may be applied to said cavity, an upstanding cut-off ring spaced radially outwards from said cavity and permitting the edges of two of said cavities to be spaced one from the other when two of said molds are brought into cooperative engagement, and an annular groove provided in said mold between said cavity and ring, and means for applying suction to said groove.

PHILLIP KALOWSKI.